US011970884B2

(12) United States Patent
Müller et al.

(10) Patent No.: US 11,970,884 B2
(45) Date of Patent: Apr. 30, 2024

(54) GOODS ANTI-THEFT DEVICE, MORE PARTICULARLY FOR CARDBOARD BOXES

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 350 days.

(21) Appl. No.: 17/435,123

(22) PCT Filed: Feb. 24, 2020

(86) PCT No.: PCT/EP2020/054743
§ 371 (c)(1),
(2) Date: Aug. 31, 2021

(87) PCT Pub. No.: WO2020/178054
PCT Pub. Date: Sep. 10, 2020

(65) Prior Publication Data

US 2022/0090416 A1 Mar. 24, 2022

(30) Foreign Application Priority Data

Mar. 1, 2019 (DE) ..................... 20 2019 101 192.0

(51) Int. Cl.
*E05B 73/00* (2006.01)
*G08B 13/24* (2006.01)
*G08B 29/04* (2006.01)

(52) U.S. Cl.
CPC ...... *E05B 73/0029* (2013.01); *G08B 13/2434* (2013.01); *G08B 29/04* (2013.01); *G08B 13/2417* (2013.01)

(58) Field of Classification Search
CPC ..... E05B 73/00; E05B 73/0029; G08B 13/00; G08B 13/22; G08B 13/24; G08B 13/2428; G08B 13/2431; G08B 13/2434; G08B 13/2437; G08B 13/2417; G08B 13/242; G08B 29/00; G08B 29/04; G08B 29/043; G08B 29/046
(Continued)

(56) References Cited

U.S. PATENT DOCUMENTS 7,486,190 B2 2/2009 Marsilio et al.
7,497,100 B2 3/2009 Fawcett et al.
(Continued)

FOREIGN PATENT DOCUMENTS

AU 2005269619 B2 * 8/2010 ............ G06K 17/00

OTHER PUBLICATIONS

International Application No. PCT/EP2020/054743, International Search Report and Written Opinion, dated Jul. 17, 2021, 23 pages.

*Primary Examiner* — Nathan Cumar
(74) *Attorney, Agent, or Firm* — Kilpatrick Townsend & Stockton LLP

(57) ABSTRACT

The invention relates to an anti-theft device configured to be attached to merchandise to be protected the anti-theft device including a housing, which comprises a winding apparatus rotatably arranged therein, at least one securing-loop arrangement designed and intended to loop around the merchandise to be protected such that the anti-theft device can be securely connected to the merchandise to be protected, and a locking mechanism.

22 Claims, 4 Drawing Sheets

Figure 1A:
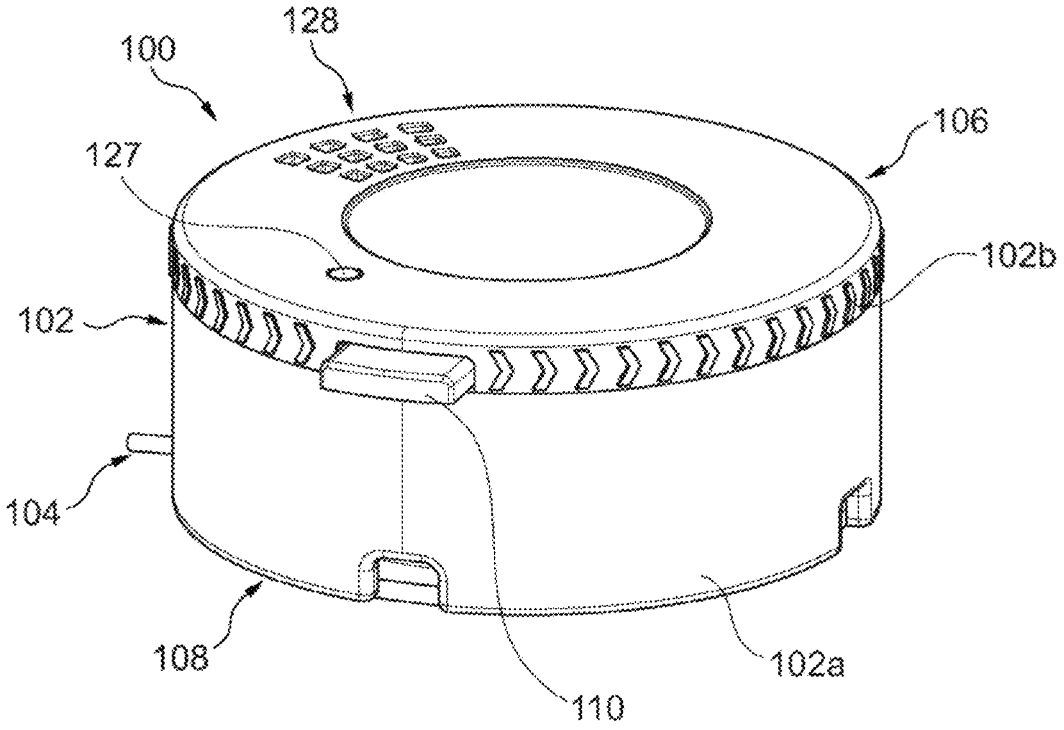

(58) Field of Classification Search
USPC ........................................................... 70/57
See application file for complete search history.

(56) References Cited

U.S. PATENT DOCUMENTS

| | | | | |
|---|---|---|---|---|
| 2006/0137409 | A1* | 6/2006 | Fawcett | G08B 13/1463 70/57.1 |
| 2006/0170559 | A1* | 8/2006 | Marsilio | G09F 3/0329 340/572.9 |
| 2018/0158296 | A1* | 6/2018 | Colby | G06K 19/07709 |
| 2018/0240316 | A1* | 8/2018 | Van Landingham, Jr | G08B 13/1472 |

* cited by examiner

GOODS ANTI-THEFT DEVICE, MORE PARTICULARLY FOR CARDBOARD BOXES

CROSS REFERENCE TO RELATED APPLICATION

This application is a U.S. national phase of International Patent Application No. PCT/EP2020/054743 filed on Feb. 24, 2020, which claims priority to German Patent Application No. 20 2019 101 192.0, filed in Germany on Mar. 1, 2019, the entire contents of both of which are hereby incorporated herein by this reference.

The invention relates to an anti-theft device configured to be attached to merchandise to be protected, preferably to cardboard boxes.

Anti-theft devices of this kind are well known and have been preferentially used for many years in the field of stores open to the public, as they provide sufficient protection against unauthorized removal from the store, or from or a demarcated sales area within said store, of merchandise sold therein. For this purpose, appropriate detector units are usually provided at all entrances and exits of the store, or of any demarcated sales areas therein, and these are designed and intended to emit an acoustic and/or visual warning signal if a customer attempts to remove any protected merchandise to which an anti-theft device of this kind is attached from the store or sales area without authorization, i.e., without paying for it beforehand.

To attach a generic anti-theft device to, for example, a substantially cuboidal cardboard box, which generally forms packaging for a product to be protected, a housing of the anti-theft device is usually first placed on one side of the cardboard box while at the same time one or more securing loops connected to a winding apparatus of the anti-theft device are arranged so as to loop around the cardboard box. Subsequently, the winding apparatus rotatably arranged in the housing of the anti-theft device is rotated in a rotational winding movement of the winding apparatus until such a point as the loop arrangement and the housing of the anti-theft device closely abut the cardboard box such that the anti-theft device is securely connected to the cardboard box.

Lastly, the anti-theft device is locked by a locking mechanism in such a way that an unwinding rotational movement of the winding apparatus is prevented such that the anti-theft device cannot be removed without authorization. Usually, the anti-theft device is not to be removed until after a sale of the merchandise protected by the anti-theft device is complete. For this purpose, in the customer service or checkout area of a store there are often appropriate unlocking devices, which can generally be operated only by the sales staff and are specially adapted to the anti-theft device; they are, for example, magnetic or have another kind of mechanical action and are designed and intended to transfer the locking mechanism of the anti-theft device to the unlocked state such that the one or more securing loops of the securing-loop arrangement can be enlarged again by the unwinding rotational movement of the winding apparatus and the anti-theft device can be detached or removed from the protected merchandise again.

However, the fact that generic anti-theft devices of this kind can usually only be unlocked using unlocking devices specifically intended for that purpose is disadvantageous since in a store where a plurality of different types of generic anti-theft devices are used, an accordingly large number of unlocking devices must also be provided.

In addition, unlocking devices of this kind are often permanently fitted in the checkout or customer service area, i.e., a corresponding anti-theft device must first always be transported to the location of a matching, permanently fitted unlocking device in order to then be able to be unlocked.

The object of the present invention is therefore to provide an anti-theft device that is improved in this regard.

According to a first aspect of the invention, this object is achieved by an anti-theft device comprising a housing, which comprises a winding apparatus rotatably arranged therein, at least one securing-loop arrangement, which comprises one or more securing loops, each having at least one securing cord connected to the winding apparatus, the securing cords being windable onto the winding apparatus in response to a rotational winding movement of the winding apparatus, and being unwindable from the winding apparatus in response to a rotational unwinding movement of the winding apparatus, the securing-loop arrangement being designed and intended to loop around the merchandise to be protected such that the anti-theft device can be securely connected to the merchandise to be protected, and a locking mechanism, which is accommodated at least in part in the housing and operatively connected to the winding apparatus, the locking mechanism having an unlocked state, in which the rotational unwinding movement of the winding apparatus in the housing is permitted, and a locked state, in which the rotational unwinding motion of the winding apparatus in the housing is prevented, the locking mechanism further comprising a release element, which is made at least in part of a shape-memory alloy and is configured to cause the locking mechanism to be transferred from the locked state to the unlocked state when the shape-memory alloy is in an excited state.

By providing an additional release element on the anti-theft device according to the invention, it is possible for the anti-theft device to be unlocked even without an unlocking device or tool specifically intended for this purpose since the release element comprised by the locking mechanism itself is configured in such a way as to be capable of transferring the locking mechanism from the locked state to the unlocked state such that the unwinding rotational movement of the winding apparatus in the housing is permitted. This is made possible by the fact that the release element is made at least in part of a shape-memory alloy. By supplying energy, the shape-memory alloy can be transferred from a resting state to the excited state, in which it contracts in such a way, for example, that the locking mechanism is unlocked. When the energy supply is interrupted or terminated, the shape-memory alloy can return, preferably with assistance from a spring, to its resting state, in which the locking mechanism can be transferred back to the locked state.

Shape-memory alloys are characterized by the fact that they can transmit very large forces in relation to their material volume while having a long service life over a large number of cycles. Accordingly, the release element can have a particularly compact design and preferably be accommodated entirely in the housing of the anti-theft device. In principle, both thermally and magnetically activatable shape-memory alloys can be used in accordance with the invention. In addition, since energy need only be supplied to excite the shape-memory alloy, the anti-theft device can be unlocked by a large number of unlocking devices, preferably contactlessly. Moreover, one and the same unlocking device can preferably be used to unlock different embodiments of the anti-theft device according to the invention.

In principle, the locking mechanism of the anti-theft device according to the invention can be configured in such a way that, when the locking mechanism is in the locked state, both the unwinding rotational movement of the winding apparatus and the winding rotational movement of the winding apparatus are prevented. For this purpose, all that needs to be ensured is that the locking mechanism is never locked until the housing and the securing-loop arrangement already abut the merchandise to be protected so closely that the anti-theft device is securely attached to the merchandise to be protected. However, to make attaching the anti-theft device according to the invention to the merchandise to be protected even more convenient, according to a preferred embodiment of the invention it is proposed that the winding rotational movement of the winding apparatus is permitted both when the locking mechanism is in the unlocked state and when the locking mechanism is in the locked state. This has the significant advantage that the locking mechanism can be transferred to the locked state before, during or after the anti-theft device is attached. In addition, for example, the locking mechanism can thus be immediately locked again once the anti-theft device has been successfully unlocked and removed such that locking cannot be overlooked when subsequently assembling the anti-theft device on other merchandise to be protected.

To be able to selectively prevent or permit the rotational unwinding movement of the winding apparatus in the housing depending on the state assumed by the locking mechanism, the locking mechanism can further comprise teeth and/or another interlocking engagement connection that, when the locking mechanism is in the locked or unlocked state, can be engaged with or disengaged from the housing in such a way that the rotational unwinding movement of the winding apparatus is prevented or permitted, respectively. According to a preferred embodiment, the locking mechanism can further comprise external teeth that can be engaged with internal teeth formed on the housing. According to this preferred embodiment, a particularly compact locking mechanism that is also very difficult to tamper with from the outside is obtained.

To transfer the locking mechanism to the locked state particularly simply, the locking mechanism can further comprise an actuation element, preferably a slide, configured to assume a locking position when manually actuated by an operator, whereupon the locking mechanism is transferred to the locked state. The actuation element can, for example, be arranged such that it can be easily actuated manually with the thumb or another finger. If, in addition, accidental and/or unauthorized locking of the anti-theft device is to be prevented, the actuation element can alternatively also be arranged such that it can only be actuated using a tool intended for this purpose, for example by sales staff.

If the anti-theft device according to the invention comprises an actuation element of this kind, then in a development the locking mechanism can further comprise a closure element which is operatively connected to the release element and configured so as to be releasably engageable with the actuation element in order to hold the actuation element in the locking position and to allow the actuation element, when actuated by the release element, to assume a release position such that the locking mechanism is transferred to the unlocked state. The actuation element can preferably be biased in the direction of its release position, for example by means of a spring. In this way, it can be ensured that, once the locking mechanism is unlocked by the release element, the actuation element is transferred back to the release position and accordingly can be transferred back to the locking position to lock the locking mechanism again.

In principle, it is conceivable to supply any energy required for operation, and in particular for exciting the shape-memory alloy of the release element, to the anti-theft device externally. However, if the anti-theft device is also intended to operate autonomously or at least partly autonomously and/or to be capable, for example, of being unlocked without an external supply of energy or to have other functions that require a regular supply of energy, it is preferred that it further comprises a power supply unit, preferably a battery. In particular, the power supply unit can be arranged in or on the housing of the anti-theft device and is preferably rechargeable multiple times. To prevent the power supply unit from being removed without authorization while still allowing the power supply unit to be easily replaceable, it is also conceivable to provide a removable cover, by means of which the power supply unit can be removed and inserted, on an underside of the housing that is in contact with or faces the merchandise to be protected when the anti-theft device is in the attached state. To extend a replacement period of the battery, an energy recovery unit, for example in the form of a solar cell, can further be provided on an outside of the housing.

In addition, to be able to ensure that the anti-theft device is only removed by authorized persons or only once the protected merchandise has already been paid for, in a development of the invention it is proposed that said anti-theft device further comprises an alarm generation apparatus configured to emit an acoustic and/or optical alarm signal in response to an attempt to remove the anti-theft device from the merchandise to be protected without authorization. The alarm generation apparatus can preferably be configured in such a way that the alarm signal is only emitted when the locking mechanism is in the locked state. In a development, the alarm generation apparatus can further emit a release sound or a release sound sequence when the locking mechanism has been transferred to the unlocked state.

Improper removal of the anti-theft device when the locking mechanism is in the locked state can, for example, involve severing at least some of the securing cords of the securing-loop arrangement such that the anti-theft device can be removed from the merchandise to be protected. To counter this circumstance, according to a particularly preferred embodiment of the anti-theft device according to the invention the securing cords of the securing-loop arrangement can be made at least in part of an electrically conductive material and are preferably operatively connected to the alarm generation apparatus. For this purpose, the securing cords can each be connected at both ends to the alarm generation apparatus such as to form a closed circuit. The alarm generation apparatus may further be configured such as to emit an alarm signal in response to a severing of the securing cords and a resulting breakage of this circuit.

To additionally prevent attempts to tamper with the housing or the locking mechanism of the anti-theft device from going unnoticed, in a development it is proposed that the anti-theft device further comprises a light sensor which is accommodated in the housing and preferably operatively connected to the alarm generation apparatus. In this regard, the alarm generation apparatus may further be configured to emit an alarm signal in response to a signal received from the light sensor when the anti-theft device is opened without authorization.

Furthermore, to be able to indicate in a simple manner whether the anti-theft device is in a state ready for operation and/or a locked state and/or an unlocked state and/or whether the anti-theft device may have malfunctioned and/or whether a battery of the anti-theft device needs charging, said device may further comprise a status-indicating apparatus, preferably an LED light source, provided on an external surface of the housing.

To implement particularly convenient opening of the anti-theft device, in a development of the invention it is proposed that said device further comprises a signal-receiving unit, the anti-theft device being configured to cause the locking mechanism to be transferred to the unlocked state when the signal-receiving unit receives a release-initiation signal. The release-initiation signal may be intended for opening a single predetermined anti-theft device and/or for opening a plurality of predetermined anti-theft devices. The release-initiation signal is preferably an encrypted signal, which can in particular protect against unwanted tampering attempts and/or counteract unauthorized opening of the anti-theft device.

The signal-receiving unit can basically be configured in such a way that the release-initiation signal can be transmitted to the signal-receiving unit by means of a wireless connection (e.g. WLAN, Bluetooth) by a central control unit that is preferably arranged in the vicinity of the anti-theft device. However, it is also conceivable for the signal-receiving unit to be designed and intended to receive signals from a mobile terminal, preferably of a customer.

In principle, however, the signal receiving unit need not be limited to being able to receive only release-initiation signals. If, for example, product-related and/or other information are intended to be able to be received and also stored on the anti-theft device for a specific and/or indefinite period of time, according to a development of the invention it is preferred that the anti-theft device further comprises a storage apparatus, the anti-theft device further being configured to receive a product information signal and store it on the storage apparatus. The product information signal can include product-related and/or other information such as a price, in particular a customer-specific price, and/or an article/manufacturer name and/or availability information and/or similar other information relating to the merchandise protected by the anti-theft device. Analogously, the product information signal can also be transmitted to the anti-theft device, for example, by means of a wireless connection (e.g. WLAN, NFC, RFID, Bluetooth) via a central control unit that is preferably arranged in the vicinity of the anti-theft device. However, it is also conceivable to transmit the product information signal to the anti-theft device over the wireless connection by means of a mobile terminal, preferably of a customer. If the mobile terminal is a mobile terminal of a customer, it is also possible to transfer to the anti-theft device a price specifically assigned to the customer in question. The price can be provided by an application, for example an app, that is preinstalled on the mobile device and communicates with a merchandise sales system. In this way, it is also possible for a customer to carry out the entire sales process, i.e., payment and removal of the anti-theft device from the protected merchandise, independently and without further assistance from additional sales staff.

Furthermore, to make the anti-theft device particularly versatile, the signal-receiving unit may additionally be designed and intended to receive signals from a mobile terminal, for example a smartphone and/or a tablet PC and/or a smartwatch.

In general, to transmit the signals it is preferable to use a communications standard that provides compatibility with a particularly large number of mobile terminals of this kind. It may also be desirable to use encrypted signals to ensure a particularly secure connection. Furthermore, it is advantageous to use a communications standard that requires a particularly low amount of energy such that, for example, a battery of the anti-theft device can be conserved. Bluetooth, for example, provides a communications standard that is particularly well suited to meeting said requirements.

In principle, however, in addition to a signal-receiving unit, the anti-theft device can also additionally or alternatively comprise a signal-transmitting unit configured to transmit the product information signal to a mobile terminal, preferably of the above-mentioned kind, preferably in response to a product-information request operation. The product-information request operation can involve both receiving a corresponding request signal and manually actuating the anti-theft device, the signal-transmitting unit being made to transmit the product information signal for a certain period of time in each case.

Furthermore, if the anti-theft device comprises both a signal-receiving unit and a signal-transmitting unit, bidirectional communication between the mobile terminal and the anti-theft device can be provided. In this context, it is also conceivable for the anti-theft device to be able to be located by the mobile terminal while they are in communication with each other. By way of example, a customer can thus be guided in a simple manner to a product they are looking for that has the anti-theft device attached to it. Bluetooth, for example, is again suitable as a particularly preferred communications standard in this respect.

To be able to provide a particularly good identifying and/or locating function in the anti-theft device, the anti-theft device can furthermore be assigned a unique identification code, for example an identification number, which is preferably provided for identifying the merchandise protected by the anti-theft device and, if desired, for determining a location of the anti-theft device. The unique identification code can be transmitted to the anti-theft device, preferably by means of Bluetooth, and stored by a storage apparatus of the anti-theft device.

If the product information associated with the protected merchandise is intended not only to be displayed on the mobile terminal, for example, but also to be at least partly displayable on the anti-theft device itself, according to a development of the present invention it is proposed that the anti-theft device further comprises an indicator apparatus, for example a display, provided on an external surface of the housing. The display can be an "ePaper display" or an "eInk display", for example. It goes without saying, however, that in principle just a barcode or another ID can also be attached to the housing of the anti-theft device.

Lastly, according to a further embodiment, the anti-theft device according to the invention may further comprise a securing element, for example an electronic article surveillance element (EAS element), which is configured to interact with an article surveillance system, preferably an electronic article surveillance system. In particular, it can be provided that if a customer attempts to remove any protected merchandise to which the anti-theft device according to the invention is attached from a store or a sales area without authorization, i.e., without paying for it beforehand, a preferably acoustic and/or visual alarm signal is emitted. The alarm signal can be emitted, for example, at the exact moment the anti-theft device passes a detector unit associated with the electronic article surveillance system. The alarm signal can be output at the detector unit itself and/or at the anti-theft device. Alternatively or additionally, the EAS element can be supported by, for example, an RFID, NFC, Bluetooth, and/or WLAN chip module, which is preferably configured to be able to unambiguously identify the anti-theft device.

To also ensure that a customer, after having paid for the merchandise and removing the anti-theft device therefrom independently, cannot remove the anti-theft device from the sales area undetected, it is also conceivable that the alarm signal is emitted even if the customer has already paid for the merchandise protected by the anti-theft device. Basically, this can ensure that the anti-theft devices can be used several times and cannot be carried away by customers undetected and/or accidentally.

According to a second aspect of the invention, which can preferably be combined with the first aspect, the object is further achieved by an anti-theft device configured to be attached to merchandise to be protected, preferably to cardboard boxes, comprising a housing, at least one securing-loop arrangement, which comprises one or more securing loops, each having at least one securing cord that can be connected to the housing, the securing-loop arrangement being designed and intended to loop around the merchandise to be protected such that the anti-theft device can be securely connected to the merchandise to be protected, a locking mechanism, which is accommodated at least in part in the housing, interacts with the securing-loop arrangement and has an unlocked state, in which removal of the anti-theft device from the merchandise to be protected is permitted, and a locked state, in which removal of the anti-theft device from the merchandise to be protected is prevented, and a power supply unit, preferably a battery, the anti-theft device further comprising a motion sensor, which is preferably accommodated in the housing, and a control unit which is configured to receive signals from the motion sensor and to set the anti-theft device selectively in an active or an inactive operating mode depending on the signals received from the motion sensor.

In particular, the anti-theft device according to the second aspect of the present invention provides the advantage of having significantly reduced energy needs compared with known generic anti-theft devices. The inactive operating mode is characterized in particular by the fact that it has lower energy needs than the active operating mode. Therefore, the inactive operating mode can basically also be described as a "resting mode" or a "sleep mode". If the anti-theft device according to the invention is in the inactive operating mode, for example, the control unit itself therefore only needs to be operated to the extent that it monitors the signals received from the motion sensor in order to be able to decide whether or not to set the anti-theft device in the active operating mode again, whereas other functions of the control unit and of the anti-theft device as a whole can be deactivated. In particular, this can increase the service life of the power supply unit of the anti-theft device. This not only has financial advantages, since less time has to be spent on maintenance measures such as charging or replacing the power supply unit, but also has benefits in terms of the environment and resource consumption since the power supply unit, which is preferably a battery, can be used for a relatively long period of time and therefore needs replacing less frequently. It should also be mentioned at this juncture that the motion sensor can not only be accommodated in the housing, but can also be attached thereto externally.

The control unit, which is configured to receive signals from the motion sensor, which can preferably be an acceleration sensor, sets the anti-theft device in the active or inactive operating mode depending on the signals received from the motion sensor. In this context, it is conceivable, for example, that the control unit is further configured such as to set the anti-theft device in the inactive operating mode only when an acceleration measured by the motion sensor does not exceed a predetermined acceleration threshold, preferably over a predetermined time period. In this respect, it is possible to take account not only of the magnitude of the acceleration but also of an acceleration pattern since different ways of actuating the anti-theft device can differ on account of an acceleration pattern of this kind. If the anti-theft device is in the inactive operating mode, the control unit can further be configured such as to set the anti-theft device in the active operating mode only when the acceleration measured by the motion sensor exceeds the preset and/or another acceleration threshold, preferably over a predetermined time period.

With respect to the further advantages and effects of the anti-theft device according to the second aspect of the present invention, reference is made to the above explanations with respect to the anti-theft device according to the first aspect.

Figure 1B:
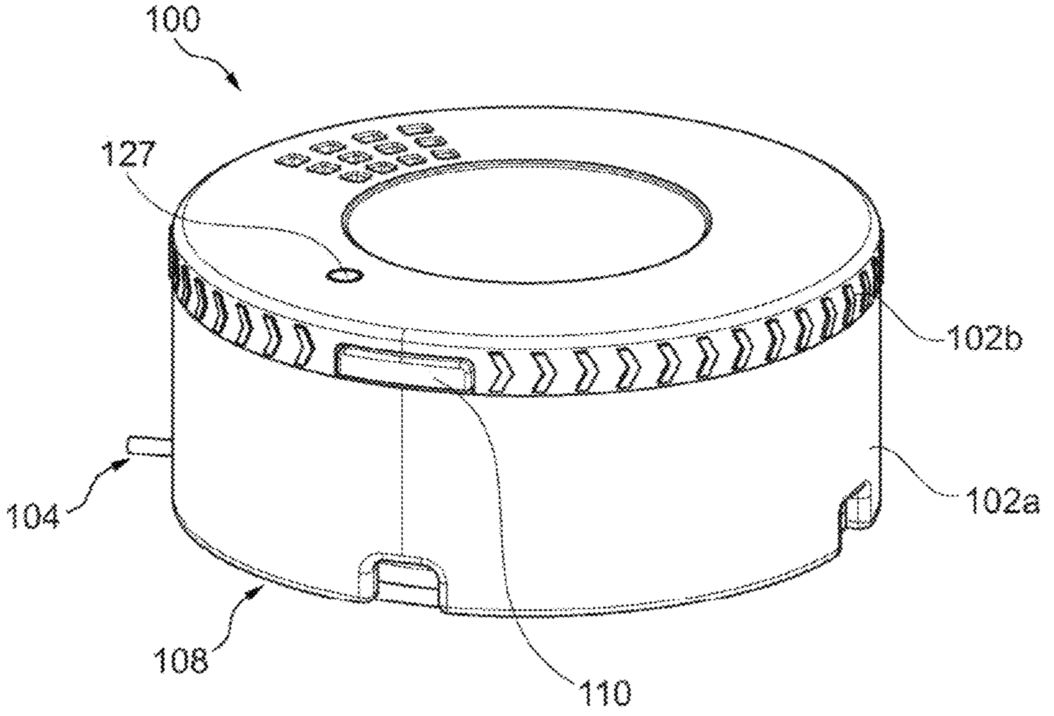
Figure 2A:
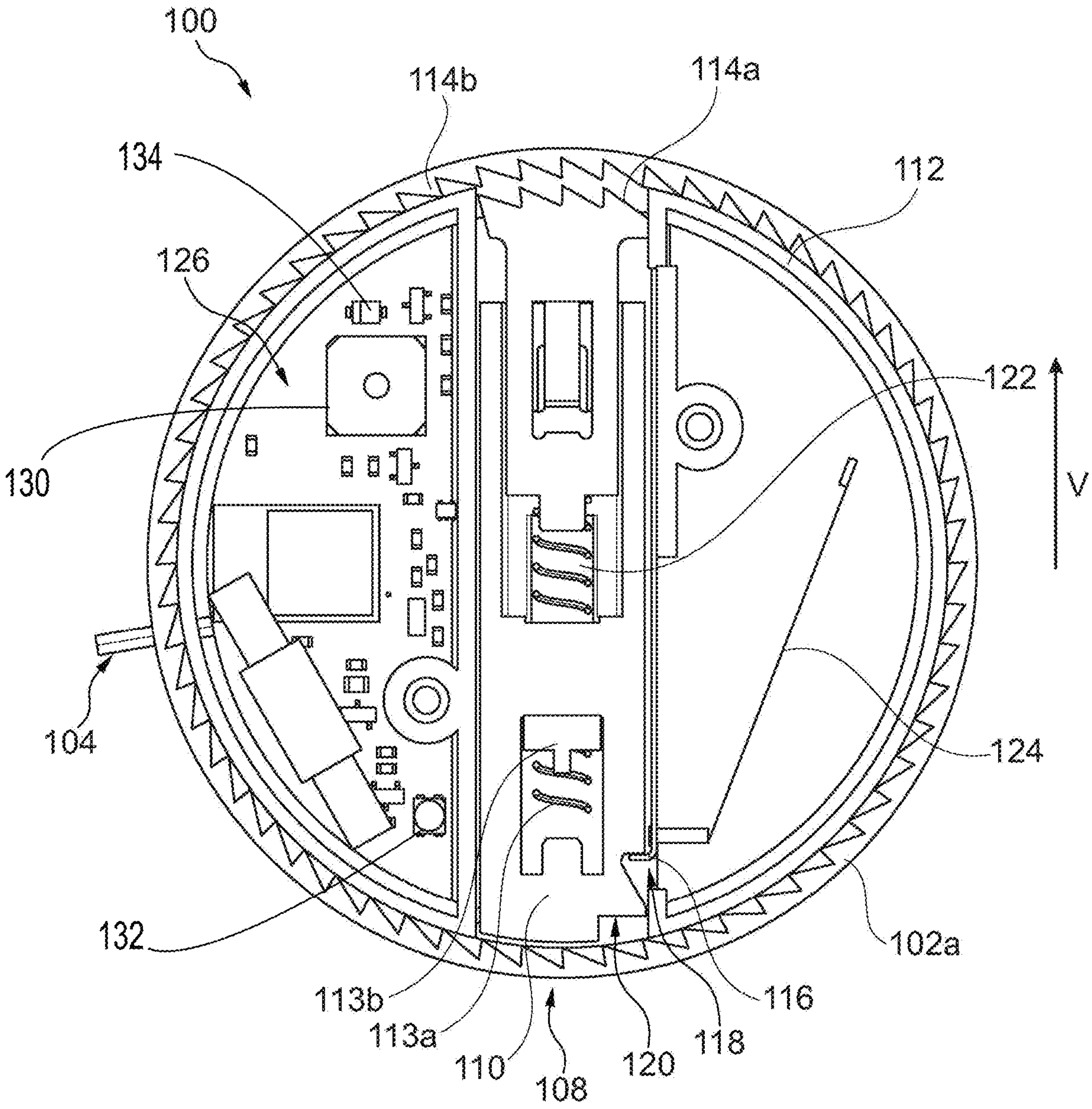
Figure 2B:
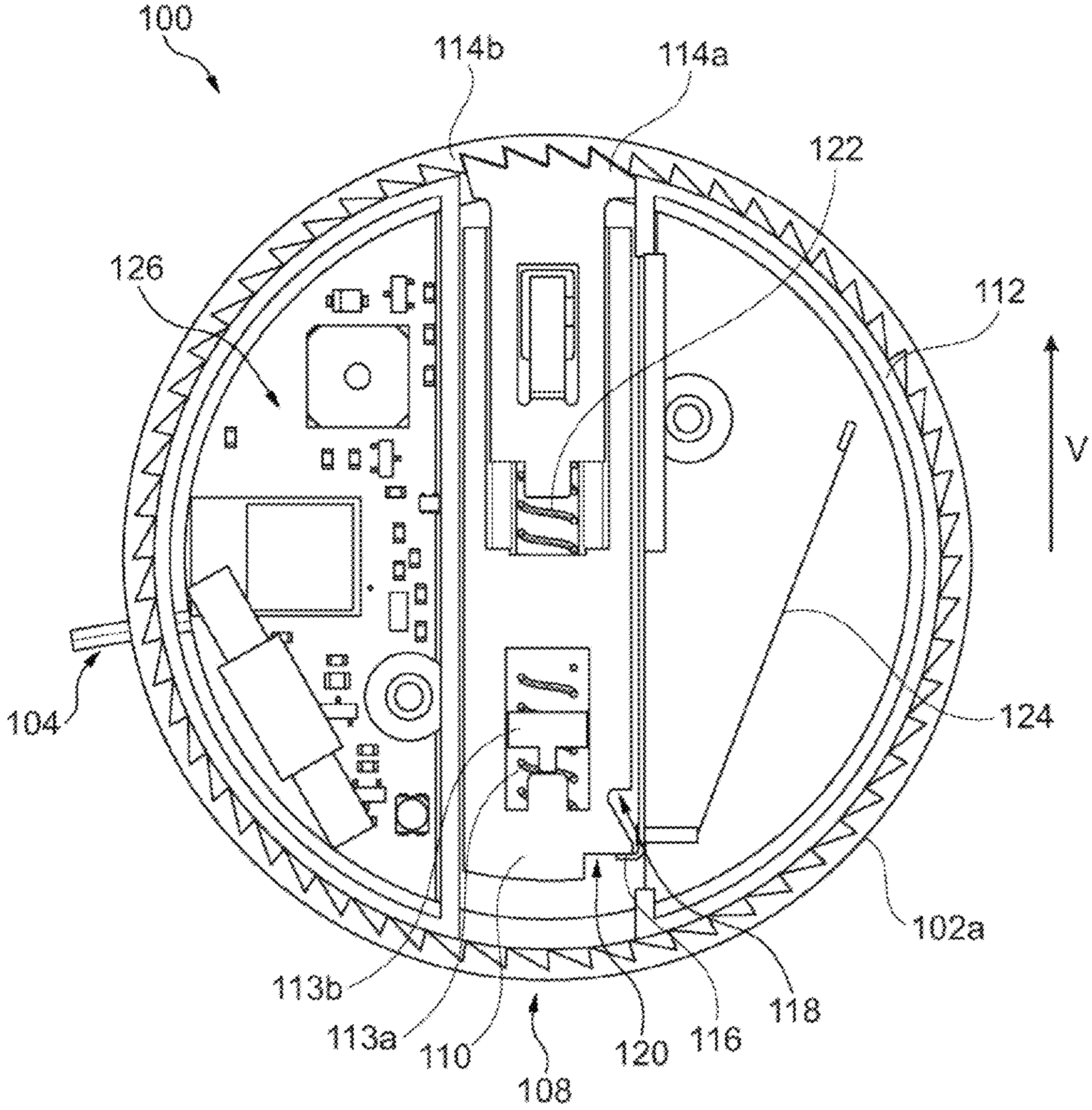
Figure 3:
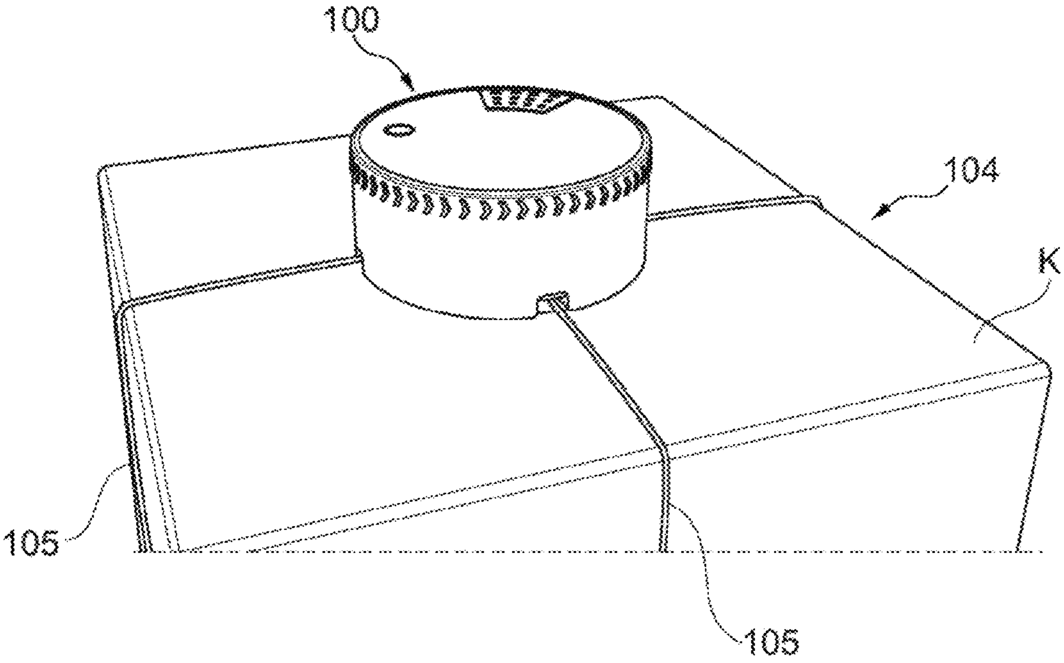

The invention will be described below in more detail on the basis of the accompanying drawings, in which:

FIGS. 1*a* and 1*b* are each perspective views of an embodiment example of an anti-theft device according to the invention in the unlocked and locked state, respectively, FIGS. 2*a* and 2*b* are each sectional views of the embodiment example of the anti-theft device according to the invention in the unlocked and locked state, respectively, and FIG. 3 is a perspective view of an embodiment example of an anti-theft device according to the invention, which is attached to a cardboard packaging box K.

FIG. 1*a* denotes an anti-theft device according to the invention in general as 100. The anti-theft device 100 comprises a housing 102, which in the embodiment example shown is formed from a main housing part 102*a* and a housing cover part 102*b*. In this regard, the main housing part 102*a* is rotatable relative to the housing cover part 102*b*. The anti-theft device 100 further comprises a securing-loop arrangement 104, although this is only shown by way of indication in FIG. 1*a*; it is designed and intended to loop around merchandise to be protected, for example a cardboard packaging box K shown in FIG. 3, such that the anti-theft device 100 according to the invention can be securely attached to the cardboard box K. For this purpose, the securing-loop arrangement 104 comprises one or more securing loops 105, which in the embodiment example shown are formed from an electrically conductive securing cable. To assemble the anti-theft device 100 on the cardboard box K, or to disassemble it therefrom, the securing-loop arrangement 104 may, respectively, be wound onto or unwound from a winding apparatus 112 that is accommodated in the housing 102 and connected to the housing cover part 102*b* for conjoint rotation. However, the winding apparatus 112 is not shown in FIGS. 1*a* and 1*b* and will be explained in more detail with reference to FIGS. 2*a* and 2*b*.

It should be noted at this juncture that the anti-theft device 100 according to the invention can be attached not only to cardboard packaging boxes of this kind, but also to unpackaged products, tools, crates, or the like.

The anti-theft device 100 further comprises a locking mechanism 108, although only a slide 110 thereof is visible in FIG. 1*a*. In FIG. 1*a*, the anti-theft device 100 according to the invention is in an unlocked state, as can be seen from the fact that the slide 110 of the locking mechanism 108 is protruding outwardly out of the housing 102 in the radial direction. In the unlocked state, the housing cover part 102*b* can be rotated both clockwise and counterclockwise relative to the main housing part 102*a*. In this regard, rotating the housing cover part 102*b* clockwise basically results in the securing-loop arrangement 104 shortening, i.e., being wound onto the winding apparatus 112 accommodated in the housing 102, whereas rotating the housing cover part 102*b* counterclockwise results in the securing-loop arrangement 104 elongating, i.e., being unwound from the winding apparatus 112 accommodated in the housing 102.

By contrast, FIG. 1*b* shows the anti-theft device 100 according to the invention in a locked state, as can be seen from the fact that the slide 110 of the locking mechanism 108 is displaced radially inwardly and latched in a locking position, such that the housing cover part 102*b* can no longer be rotated in the direction indicated by the arrows on the housing cover part 102*b*, i.e., counterclockwise, but rather only clockwise.

The locking mechanism 108 and further functional elements of the anti-theft device 100 according to the invention will be explained in more detail below with reference to FIGS. 2*a* and 2*b*, which are sectional views of the embodiment example of the anti-theft device 100 according to the invention in the unlocked and locked state, respectively.

FIG. 2*a* shows the anti-theft device 100 according to the invention in the unlocked state. As can be further seen in FIG. 2*a*, the slide 110 is connected to the winding apparatus 112 for conjoint rotation and so as to be radially displaceable. It should be noted that the part of the slide 110 shown in FIGS. 1*a* and 1 *b*, protruding outwardly out of the housing 102, has been omitted in FIGS. 2*a* and 2*b* for clarity, so FIGS. 2*a* and 2*b* only show the part of the slide 110 accommodated in the housing 102. The slide 110 is biased outward in the radial direction by a spring 113*a*. However, since a stop 113*b* associated with the spring 113*a* and connected to the winding apparatus 112 is provided, the slide 110 can only be moved so far radially outwardly until it abuts the stop 113*b*, such that it is in its release position shown in FIG. 2*a*. The slide 110 further comprises external teeth 114*b* that can be engaged with internal teeth 114*a* formed on the main housing part 102*a*. In this regard, the internal teeth 114*a* are formed around the entire inner circumference of the main housing part 102*a*. The external teeth 114*a* are attached to the slide 110 and can be engaged with the internal teeth 114*b* by radially displacing the slide 110 in the positive direction V. In the unlocked state shown in FIG. 2*a*, the external teeth 114*a* and the internal teeth 114*b* are not engaged with each other, and so the winding apparatus 112, which is connected to the slide 110 for conjoint rotation, can be rotated both clockwise and counterclockwise.

FIG. 2*b* shows the anti-theft device 100 according to the invention in the locked state after the slide 110 has been displaced from FIG. 2*a* in the positive direction V into its locking position. To prevent the slide 110 from being able to be pushed back by the spring 113*a*, the locking mechanism 108 further comprises a closure element 116, which in the embodiment example shown is in the form of a metal sheet bent at one end, for example made of spring bronze or the like. When the slide 110 is displaced in the positive direction V, the closure element 116 initially follows a gradient of a recess 118 formed on the slide 110 until it latches with another recess 120 formed on the slide 110 such that the slide 110 can no longer be displaced in the negative direction V. As a result, the external teeth 114*a* will remain engaged with the internal teeth and, as can be seen from the geometry of the teeth, will prevent the winding apparatus 112 from being rotated counterclockwise until the slide 110 is transferred back to its release position shown in FIG. 2*a*.

However, to allow the winding apparatus 112 connected to the slide 110 to move clockwise even when the locking mechanism 108 is in the locked state shown in FIG. 2*b*, the external teeth 114*a* are radially displaceably connected to the slide 110 by means of a further spring 122 and are biased radially outwardly by the spring 122 such that the external teeth 114*a* can initially be displaced radially inwardly over the gradient of the internal teeth 114*b* and, after a clockwise rotation, can each latch with adjacent teeth of the internal teeth 114*b* again so that counterclockwise rotation is still prevented.

In order to return from the locked state of the locking mechanism 108 shown in FIG. 2*b* to the unlocked state of the locking mechanism 108 shown in FIG. 2*a*, the locking mechanism 108 further comprises a release element 124, which in the embodiment example shown is in the form of a wire 124 made of a shape-memory alloy. The wire 124 is connected to the closure element 116. When the wire 124 is heated by applying electrical energy, it contracts, causing the closure element 116 to be moved away from the recess 120 formed on the slide 110, whereupon the slide 110 can be transferred back to its release position by the spring 113*a*. When heating of the wire 124 is terminated again, once the wire has cooled down it can return to the starting position shown in FIG. 2*a*, i.e., back into the recess 118. This is assisted by the spring action of the closure element 116. In this regard, the energy required to heat the wire 124 may be provided, for example, by a battery (not shown in detail in FIGS. 2*a* and 2*b* either), which is also accommodated in the housing 102. In the process, the heating of the wire 124 may be controlled, for example, by a chip unit 126 also accommodated in the housing 102.

In this case, the chip unit 126 may further be equipped with a signal-receiving unit and/or a signal-transmitting unit, which is/are configured preferably to communicate with a mobile terminal of a customer. By way of example, it is thus possible for the chip unit 126 to cause the wire 124 to be heated only after a release-initiation signal is received by the signal-receiving unit included in the chip unit 126. The release-initiation signal is preferably not sent by the mobile terminal to the signal-receiving unit until the customer has successfully completed a payment process.

Lastly, the chip unit 126 may further comprise a storage unit, which is preferably integrated therein and configured to store, inter alia, product information relating to the merchandise to be protected. To display this product information, the anti-theft device 100 may further comprise a display (not shown in FIG. 1*a* and FIG. 1*b*), which may preferably be arranged on an external surface of the housing cover part 102*b*.

To furthermore be able to ensure that the anti-theft device 100 according to the invention can be operated in a particularly energy-saving manner, the chip unit 126 further comprises a control unit 130 which is configured to set the anti-theft device selectively in an active operating mode or an inactive, preferably energy-saving, operating mode. For this purpose, the anti-theft device 100 further comprises a motion sensor 132, which can be an acceleration sensor, which is preferably also comprised by the chip unit 126 and connected to the control unit 130, the control unit 130 being configured such as to set the anti-theft device 100 in the active or the inactive operating mode depending on the signals received from the acceleration sensor.

The anti-theft device 100 may further comprise an LED light source 127 arranged on the housing cover part 102*b*, which may be in the form of a colored LED light source, for example. By way of example, it is conceivable that the LED light source 127 illuminates in the color red to indicate a locked state of the anti-theft device 100, whereas the color green may be selected as the illuminating color to indicate an unlocked state. However, it goes without saying that any such LED light source 127 may also have a plurality of other illumination states/colors that may be used, for example, to indicate other operational states of the anti-theft device 100.

To emit an alarm signal, the anti-theft device 100 may further comprise an acoustic alarm generation apparatus 128, which is operatively connected to the chip unit 126 but is indicated in FIGS. 1*a* and 1*b* only by holes provided for this purpose in the housing cover part 102*b*. By way of example, the alarm signal may be emitted when at least one of the securing loops 105 of the securing-loop arrangement 104 is severed in whole or in part. Additionally or alternatively, the chip unit 126 may further comprise a light sensor 134 such that the alarm signal may also be emitted, for example, if an unauthorized person attempts to remove the housing cover part 102*b* for the purpose of tampering with the locking mechanism 108 while the anti-theft device 100 is in the locked state.

It should be added that the anti-theft device 100 can further comprise an electronic article surveillance element (EAS element) (not shown in FIGS. 2*a* and 2*b*) which is configured to interact with an electronic article surveillance system (not shown either) such that when a customer attempts to remove protected merchandise to which the anti-theft device 100 is attached from a store, for example, without authorization, the alarm signal is output as soon as the merchandise passes a detector unit associated with the electronic article surveillance system.

The invention claimed is:

1. Anti-theft device configured to be attached to merchandise to be protected, the anti-theft device comprising:

a housing, which comprises a winding apparatus rotatably arranged therein;

at least one securing-loop arrangement, which comprises one or more securing loops, each having at least one securing cord connected to the winding apparatus, the securing cords being windable onto the winding apparatus in response to a rotational winding movement of the winding apparatus, and being unwindable from the winding apparatus in response to a rotational unwinding movement of the winding apparatus, the securing-loop arrangement being designed and intended to loop around the merchandise to be protected such that the anti-theft device can be securely connected to the merchandise to be protected; and a locking mechanism, which is accommodated at least in part in the housing and is operatively connected to the winding apparatus, the locking mechanism having an unlocked state, in which the rotational unwinding movement of the winding apparatus in the housing is permitted, and a locked state, in which the rotational unwinding movement of the winding apparatus in the housing is prevented, wherein the locking mechanism further comprises a release element, which is made at least in part of a shape-memory alloy and is configured to cause the locking mechanism to be transferred from the locked state to the unlocked state when the shape-memory alloy is in an excited state, and wherein the locking mechanism is further configured so as to permit the rotational winding movement of the winding apparatus when the locking mechanism is in the unlocked state and when the locking mechanism is in the locked state.

2. Anti-theft device according to claim 1, wherein the locking mechanism further comprises external teeth that can be engaged with internal teeth formed on the housing.

3. Anti-theft device according to claim 1, wherein the locking mechanism further comprises an actuation element which is configured to assume a locking position when manually actuated by an operator, whereupon the locking mechanism is transferred to the locked state.

4. Anti-theft device according to claim 3, wherein the locking mechanism further comprises a closure element which is operatively connected to the release element and configured so as to be releasably engageable with the actuation element in order to hold the actuation element in the locking position and to allow the actuation element, when actuated by the release element, to assume a release position such that the locking mechanism is transferred to the unlocked state.

5. Anti-theft device according to claim 3, wherein the actuation element is a slide.

6. Anti-theft device according to claim 1, wherein the anti-theft device further comprises a power supply unit.

7. Anti-theft device according to claim 6, wherein the anti-theft device further comprises an alarm generation apparatus configured to emit an acoustic and/or optical alarm signal in response to an attempt to remove the anti-theft device from the merchandise to be protected without authorization.

8. Anti-theft device according to claim 6, wherein the securing cords of the securing-loop arrangement are made at least in part of an electrically conductive material.

9. Anti-theft device according to claim 8, wherein the securing cords of the securing-loop arrangement are operatively connected to an alarm generation apparatus configured to emit an acoustic and/or optical alarm signal in response to an attempt to remove the anti-theft device from the merchandise to be protected without authorization.

10. Anti-theft device according to claim 6, wherein the anti-theft device further comprises a light sensor, which is accommodated in the housing.

11. Anti-theft device according to claim 10, wherein the light sensor is operatively connected to an alarm generation apparatus configured to emit an acoustic and/or optical alarm signal in response to an attempt to remove the anti-theft device from the merchandise to be protected without authorization.

12. Anti-theft device according to claim 6, wherein the anti-theft device further comprises a signal-receiving unit, the anti-theft device being configured to cause the locking mechanism to be transferred to the unlocked state when the signal-receiving unit receives a release-initiation signal.

13. Anti-theft device according to claim 6, wherein the anti-theft device further comprises a storage apparatus, the anti-theft device further being configured to receive a product information signal and store it on the storage apparatus.

14. Anti-theft device according to claim 6, wherein the anti-theft device further comprises a signal-transmitting unit.

15. Anti-theft device according to claim 14, wherein the signal-transmitting unit is configured to transmit a product information signal to a mobile terminal in response to a product-information request operation.

16. Anti-theft device according to claim 6, wherein the power supply unit is a battery.

17. Anti-theft device according to claim 1, wherein the anti-theft device is assigned a unique identification code, which is provided for identifying the merchandise protected by the anti-theft device and/or determining a location of the anti-theft device.

18. Anti-theft device according to claim 1, wherein the anti-theft device further comprises an indicator apparatus provided on an external surface of the housing.

19. Anti-theft device according to claim 1, wherein the anti-theft device further comprises a securing element configured to interact with an article surveillance system.

20. Anti-theft device configured to be attached to merchandise to be protected, comprising:

a housing;

at least one securing-loop arrangement, which comprises one or more securing loops, each having at least one securing cord that can be connected to the housing, the securing-loop arrangement being designed and intended to loop around the merchandise to be protected such that the anti-theft device can be securely connected to the merchandise to be protected;

a locking mechanism, which is accommodated at least in part in the housing, interacts with the securing-loop arrangement and has an unlocked state, in which removal of the anti-theft device from the merchandise to be protected is permitted, and a locked state, in which removal of the anti-theft device from the merchandise to be protected is prevented; and a power supply unit, wherein the anti-theft device further comprises:

a motion sensor; and a control unit which is configured to receive signals from the motion sensor and to set the anti-theft device selectively in an active or an inactive operating mode depending on the signals received from the motion sensor.

21. Anti-theft device according to claim 20, wherein the power supply unit is a battery.

22. Anti-theft device according to claim 20, wherein the motion sensor is accommodated in the housing.

* * * * *